(12) United States Patent
Muehlenbrock et al.

(10) Patent No.: US 12,122,320 B2
(45) Date of Patent: Oct. 22, 2024

(54) VEHICLE SEAT STRUCTURE AND METHOD FOR ASSEMBLING A VEHICLE SEAT STRUCTURE

(71) Applicant: Adient US LLC, Plymouth, MI (US)

(72) Inventors: Ludger Muehlenbrock, Recklinghausen (DE); Toralf Mueller, Leverkusen (DE); Tobias Schaffert, Solingen (DE); Klaus Tupuschies, Muehlheim an der Ruhr (DE)

(73) Assignee: Adient US LLC, Plymouth, MI (US)

( * ) Notice: Subject to any disclaimer, the term of this patent is extended or adjusted under 35 U.S.C. 154(b) by 0 days.

(21) Appl. No.: 18/310,778

(22) Filed: May 2, 2023

(65) Prior Publication Data

US 2023/0264650 A1    Aug. 24, 2023

Related U.S. Application Data

(62) Division of application No. 17/281,284, filed as application No. PCT/EP2019/077889 on Oct. 15, 2019, now Pat. No. 11,945,398.

(30) Foreign Application Priority Data

Oct. 22, 2018 (DE) ...................... 10 2018 126 207.8

(51) Int. Cl.
*B60R 22/26* (2006.01)
*B60N 2/22* (2006.01)
*B60N 2/68* (2006.01)

(52) U.S. Cl.
CPC ............ *B60R 22/26* (2013.01); *B60N 2/2222* (2013.01); *B60N 2/682* (2013.01); *B60N 2002/684* (2013.01)

(58) Field of Classification Search
CPC ...... B60R 22/26; B60N 2/2222; B60N 2/682; B60N 2002/684
See application file for complete search history.

(56) References Cited

U.S. PATENT DOCUMENTS

| 3,091,496 A | 5/1963 | Bentley |
| 5,088,794 A * | 2/1992 | Iwami ..................... B60R 22/20 |
| | | 297/483 |

(Continued)

FOREIGN PATENT DOCUMENTS

| CN | 1519146 A | 8/2004 |
| CN | 204383104 U | 6/2015 |

(Continued)

OTHER PUBLICATIONS

China National Intellectual Property Administration, Office Action in Application No. 201980069419.3, dated Oct. 9, 2022, 18 pages.

(Continued)

*Primary Examiner* — Toan C To
(74) *Attorney, Agent, or Firm* — Marshall & Melhorn, LLC

(57) ABSTRACT

A vehicle seat structure has a structural component which has an automatic belt unit. The automatic belt unit is arranged in a hollow space of the structural component and the structural component is connected in a positive-locking and/or materially engaging and/or non-positive-locking manner to at least one other component of the vehicle seat structure. The vehicle seat structure has a seat substructure and the structural component which has an automatic belt unit forms a component of the seat substructure. The structural component which has the automatic belt unit forms a seat frame side portion of the seat substructure A method for assembling such a vehicle seat structure is also provided.

5 Claims, 13 Drawing Sheets

(56) References Cited

U.S. PATENT DOCUMENTS

| | | | | |
|---|---|---|---|---|
| 5,390,982 | A * | 2/1995 | Johnson | B60N 2/829 297/483 |
| 5,441,332 | A * | 8/1995 | Verellen | B60R 22/26 297/483 |
| 5,653,504 | A * | 8/1997 | Henson | B60N 2/3084 297/238 |
| 5,704,684 | A * | 1/1998 | Dukatz | B60R 22/357 297/238 |
| 5,829,831 | A * | 11/1998 | Sharman | B60R 22/34 297/483 |
| 5,934,760 | A | 8/1999 | Schroth | |
| 6,139,111 | A * | 10/2000 | Pywell | B60N 2/809 297/216.13 |
| 6,682,009 | B1 * | 1/2004 | Frank | B60R 22/3413 242/379.1 |
| 6,811,186 | B1 * | 11/2004 | Fraley | B60R 22/20 297/483 |
| 6,817,672 | B2 * | 11/2004 | Matsunuma | B60N 2/688 297/483 |
| 7,159,478 | B2 * | 1/2007 | Schubert | B60R 22/00 73/865.9 |
| 8,303,043 | B2 * | 11/2012 | Humbert | B60R 22/40 297/477 |
| 8,820,789 | B2 * | 9/2014 | Merrill | B60R 22/26 297/480 |
| 10,144,326 | B2 * | 12/2018 | Hayashi | B60N 2/688 |
| 10,273,008 | B2 * | 4/2019 | Porter | B64D 11/062 |
| 10,870,410 | B2 * | 12/2020 | Jabusch | B60N 2/688 |
| 10,933,784 | B2 * | 3/2021 | Yilma | B60N 2/6009 |
| 10,933,821 | B2 * | 3/2021 | Line | A61L 2/10 |
| 11,577,687 | B2 * | 2/2023 | Jabusch | B60R 22/4628 |
| 2002/0195838 | A1 * | 12/2002 | Motozawa | B60N 2/42736 296/68.1 |
| 2003/0047971 | A1 | 3/2003 | Fohrenkamm et al. | |
| 2003/0160498 | A1 * | 8/2003 | Boelstler | B60R 22/26 297/483 |
| 2004/0036345 | A1 * | 2/2004 | Herberg | B60R 22/44 297/480 |
| 2004/0251675 | A1 * | 12/2004 | Herberg | B60R 22/4604 280/806 |
| 2004/0262905 | A1 * | 12/2004 | Herberg | B60R 22/02 280/808 |
| 2005/0121897 | A1 | 6/2005 | Elizondo et al. | |
| 2008/0116679 | A1 | 5/2008 | Burckkhard et al. | |
| 2008/0296884 | A1 * | 12/2008 | Rouhana | B60R 22/26 280/808 |
| 2017/0088094 | A1 | 3/2017 | Hillman | |
| 2020/0047710 | A1 * | 2/2020 | Jabusch | B60R 22/34 |

FOREIGN PATENT DOCUMENTS

| | | |
|---|---|---|
| CN | 204472747 U | 7/2015 |
| CN | 105793107 A | 7/2016 |
| DE | 69501759 T2 | 10/1998 |
| DE | 102012022159 B4 | 2/2021 |
| EP | 2644444 A1 | 10/2013 |
| EP | 3238989 A1 | 11/2017 |
| FR | 3034062 A3 | 9/2016 |
| GB | 2435244 A | 8/2007 |
| JP | 2007112198 A | 5/2007 |
| JP | 2017226336 A | 12/2017 |

OTHER PUBLICATIONS

European Patent Office, International Search Report and Written Opinion in Application No. PCT/EP2019/077889, dated Dec. 17, 2019, 17 pages, Rijswijk, Netherlands.

European Patent Office, Search Report for application No. 22196582.5 dated Jan. 17, 2023, 8 pages.

China National Intellectual Property Administration, Office Action in Application No. CN201980069419.3, dated Aug. 3, 2023, 16 pages.

* cited by examiner

VEHICLE SEAT STRUCTURE AND METHOD FOR ASSEMBLING A VEHICLE SEAT STRUCTURE

This application is a Divisional Application of U.S. application Ser. No. 17/281,284, filed Mar. 30, 2021, which is a United States National Phase Application of International Application PCT/EP2019/077889, filed Oct. 15, 2019, and claims the benefit of priority under 35 U.S.C. § 119 of German Application 10 2018 126 207.8, filed Oct. 22, 2018, the entire contents of which are incorporated herein by reference.

FIELD

The invention relates to a vehicle seat structure for a vehicle seat, having a structural component which has an automatic belt unit, and a method for assembling such a vehicle seat structure.

BACKGROUND

DE 10 2012 022 159 A1 discloses a backrest structure for a vehicle seat, in particular for a foldable backrest of a rear seat installation of a motor vehicle, wherein the backrest structure comprises an installation shaft in which an automatic belt unit can be inserted. During assembly of the vehicle seat, the automatic belt unit is inserted from above into the installation shaft after production of the backrest structure.

DE 695 01 759 T2 discloses a vehicle seat structure having a structural component which has an automatic belt unit, wherein the automatic belt unit is arranged in a hollow space of the structural component, and the structural component is connected in a positive-locking manner using connection means to another component of the vehicle seat structure, wherein the vehicle seat structure has a backrest structure, the backrest structure having a first lateral strut and a second lateral strut, wherein the structural component which has the automatic belt unit connects the two struts to each other.

EP 2 644 444 A1 discloses a vehicle seat structure for a vehicle seat, with a housing having an automatic seatbelt unit, the automatic seatbelt unit being arranged in a cavity of the housing, and the housing being fastened to a seat substructure. The housing is oriented in a lateral direction and disposed below a backrest on the seat substructure.

FR 3 034 062 A3 discloses a vehicle seat comprising a seat frame, a backrest attached to the seat frame, and a bracket for pivotally attaching the seat frame to a vehicle body. The seat frame is pivotable about a pivot axis relative to the console. The console can be firmly connected to the vehicle body. An automatic belt unit of a safety belt system of the vehicle seat is firmly connected to the console, so that the seat frame can be pivoted to the automatic belt unit.

Vehicle seat structures having a structural component which has an automatic belt unit, wherein the automatic belt unit is arranged in a hollow space of the structural component and the structural component is connected to another component of the vehicle seat structure, are further known from U.S. Pat. Nos. 3,091,496 A and 5,934,760 A.

SUMMARY

An object of the invention is to improve a vehicle seat of the type mentioned in the introduction, in particular to optimise the integration of an automatic belt unit in the vehicle seat structure with regard to the required structural space and the force flow. In particular, a cost-effective assembly method for such a vehicle seat is also intended to be provided.

This object is achieved according to the invention with a vehicle seat structure for a vehicle seat, having a structural component which has an automatic belt unit, wherein the automatic belt unit is arranged in a hollow space of the structural component and the structural component is connected in a positive-locking and/or materially engaging and/or non-positive-locking manner to at least one other component of the vehicle seat structure, wherein the vehicle seat structure has a seat substructure, wherein the structural component which has the automatic belt unit forms a component of the seat substructure.

A "structural component and one other component of the vehicle seat structure" is in each case intended to be understood to be a load-bearing component of the vehicle seat structure. A significant function of the structural component and the additional component of the vehicle seat structure is consequently to ensure the necessary rigidity and strength of the vehicle seat structure for correct use of the vehicle seat, but particularly also in the event of a crash. In contrast, for example, upholstery components and covers generally have no load-bearing function.

As a result of the fact that the structural component has a hollow space, wherein the automatic belt unit is arranged in the hollow space and the structural component is connected in a positive-locking and/or materially engaging and/or non-positive-locking manner to at least one other component of the vehicle seat structure, the integration of the automatic belt unit in the vehicle seat structure is optimised with regard to the required structural space and the force path.

The structural component which has the automatic belt unit forms a seat frame side portion of the seat substructure.

An automatic belt unit for winding up a lap belt of a belt system may be arranged in the structural component. The belt system may be in the form of a 3-point belt system. The belt system may be a safety belt system.

The belt system may have a second automatic belt unit in the region of a backrest. The vehicle seat structure may have both a structural component having an automatic belt unit for winding up a lap belt of a belt system and another structural component having an automatic belt unit for winding up a shoulder belt. The two automatic belt units may be components of precisely one 3-point belt system.

Preferably, the vehicle seat structure has a backrest structure. The backrest structure may have a first side rail and a second side rail. At least one of the two side rails may be composed of a first side rail profile and at least one second side rail profile. Preferably, the side rail profiles form a side rail having a substantially closed profile. A closed profile has a high level of rigidity and can discharge high belt loads.

An automatic belt unit for winding up a shoulder belt of a belt system may be arranged in a structural component. The belt system may be a three-point belt system.

The backrest structure may be securely connected to the seat substructure. The backrest structure may be pivotably articulated to the seat substructure by at least one fitting. The structural component which has an automatic belt unit forms a component of the seat substructure. The structural component which has the automatic belt unit is a seat frame side portion of the seat substructure. An automatic belt unit for winding up a lap belt of a belt system may be arranged in the structural component. The belt system may be a 3-point belt system. The vehicle seat structure may have both a structural component having an automatic belt unit for winding up a shoulder belt and another structural component having an automatic belt unit for winding up a lap belt of a belt system. The two automatic belt units may be a component of precisely one 3-point belt system.

The object is additionally achieved by a method for assembling a vehicle seat structure according to the invention, wherein in a method step the structural component which has the automatic belt unit and the two side rails are displaced relative to each other so that the structural component and the two side rails assume an end position with respect to each other, and the structural component and the two side rails are screwed to each other in another method step.

As a result of the fact that the structural component and the two side rails are displaced relative to each other in a method step so that the structural component and the at least one other component of the vehicle seat structure assume the end position thereof with respect to each other and are screwed together in another method step, a cost-effective assembly method for such a vehicle seat is provided.

The structural component which has the automatic belt unit is preferably a testable unit. The function of the structural component which has the automatic belt unit can be tested prior to the connection of the structural component which has the automatic belt unit to the at least one additional component of the vehicle seat structure. In particular, the function of the automatic belt unit can be tested. This has the advantage that defective structural components and defective automatic belt units can be identified in a timely manner and consequently the quality costs can be reduced.

The vehicle seat structure may have a stop means, in particular a stop face. The structural component which has the automatic belt unit can run up against the stop means during the assembly method when reaching the end position.

A possibility is provided of supplying a structural component, having an automatic belt unit, in a translational and/or rotational manner either from above and/or from the front and/or from the rear and/or in the direction of an upper region of the vehicle seat and/or in the direction of a lower region of the vehicle seat of a sub-assembly of the vehicle seat structure and connecting therewith. The fixing is preferably configured in such a manner that tolerances can be overcome and play and rattling noises are prevented. The assembly method preferably comprises carrying out a connection of the structural component to the automatic belt unit which is arranged therein to at least one other component of the vehicle seat structure by at least one screw and/or at least one rivet and/or at least one Tox connection and/or at least one clip-fit connection and/or an overpressing and/or an adhesion and/or a welding. A positive-locking connection may also be a component of the assembly.

One or more headrests may be secured to the structural component which is constructed according to the invention. A headrest can be secured to the structural component by screwing and/or riveting and/or welding. In particular, pipes for a standard headrest can be connected to the structural component. However, a headrest having a height adjustment within the headrest or an integrated headrest may also be secured in this manner. Cushioned coverings, loudspeakers, a rear-seat entertainment system or other complete seat components may also be assembled on the structural component having the automatic belt system. Additional functions, for example, an airbag inflator for an in particular remote side airbag can be mounted within the structural component.

DESCRIPTION OF THE FIGURES

The invention is explained in greater detail below with reference to advantageous embodiments illustrated in the Figures. However, the invention is not limited to these embodiments. In the drawings.

DETAILED DESCRIPTION

Figure 1:
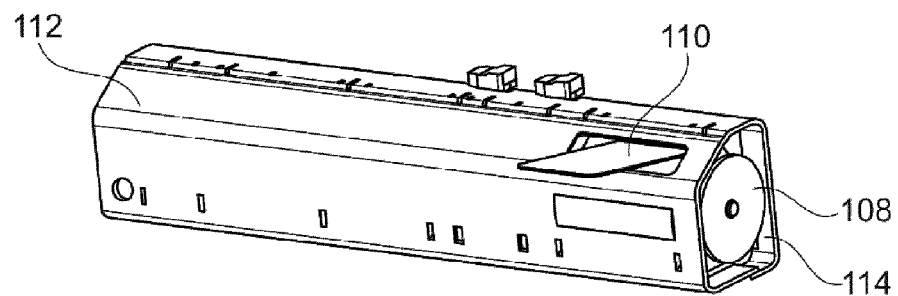
FIG. 1: shows a structural component with an automatic belt unit arranged therein.

Comparable components always have the same reference numerals in the embodiments.

A vehicle seat structure 100 of a vehicle seat for a motor vehicle has a seat substructure 102 and a backrest structure 104 which can be adjusted in terms of its inclination relative to the seat substructure 102 and which is secured to the seat substructure 102 so as to be able to be adjusted in terms of inclination by a fitting 106, preferably by two fittings 106. The vehicle seat comprises the vehicle seat structure 100, a plurality of upholstery and cover components which cover the vehicle seat structure 100 and other attachments, such as, for example, a headrest. The vehicle seat additionally comprises a safety belt system, in particular a 3-point belt system, having at least one automatic belt unit 108. The automatic belt unit 108 has in particular the function of a belt roller which winds up and unwinds a belt band 110 of the safety belt system. In the event of a crash, an unwinding of the belt band 110 by a mechanism of the automatic belt unit 108 is automatically blocked.

The vehicle seat structure 100 is described below using three spatial directions which extend perpendicularly relative to each other. A longitudinal direction x extends in a vehicle seat which is installed in the motor vehicle substantially horizontally and preferably parallel with a longitudinal vehicle direction which corresponds to the usual travel direction of the vehicle. A transverse direction y which extends perpendicularly to the longitudinal direction x is also orientated horizontally in the vehicle and extends parallel with a transverse vehicle direction. A vertical direction z extends perpendicularly to the longitudinal direction x and perpendicularly to the transverse direction y. In a vehicle seat which is installed in the vehicle, the vertical direction z extends parallel with the vertical vehicle axis.

The position and direction indications used, such as, for example, front, rear, top and bottom, refer to a viewing direction of a passenger seated in the vehicle seat in a normal seat position, wherein the vehicle seat is installed in the vehicle, is in a suitable position for use with respect to transporting persons with an upright backrest and is orientated as usual in the travel direction. However, the vehicle seat may also be installed with a different orientation, for example, transversely relative to the travel direction.

FIG. 1 shows a structural component 112 of a vehicle seat structure 100 according to a first embodiment. The automatic belt unit 108 is integrated in the structural component 112. The automatic belt unit 108 is preferably arranged in a hollow space 114 of the structural component 112. The structural component 112 forms with the automatic belt unit 108 which is arranged therein a testable unit which can be tested in terms of function in particular prior to an assembly of the structural component 112 on other components of the vehicle seat structure 100. The automatic belt unit 108 is preferably securely connected to the structural component 112, preferably screwed. The structural component 112 may be a significant component of the automatic belt unit 108, for example, a housing component of the automatic belt unit 108. The structural component 112 is in this instance a profiled pipe, preferably composed of at least two in particular profiled metal sheets.

Figure 2:
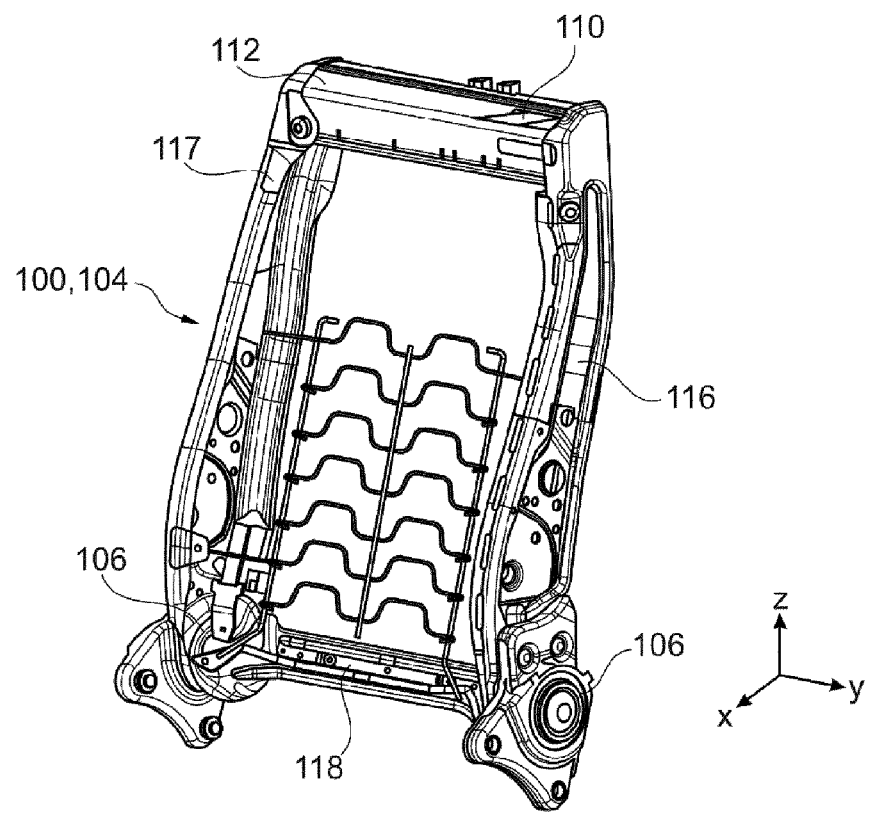
FIG. 2: shows a perspective view of a backrest structure of a vehicle seat structure when viewed obliquely from the front according to a first embodiment which is not in accordance with the invention and in which a structural component with an automatic belt unit arranged therein forms an upper cross bar of the backrest structure.

FIG. 2 shows a backrest structure 104 of the vehicle seat structure 100 of the first embodiment, in which a structural component 112 with an automatic belt unit 108 arranged therein forms an upper cross bar of the backrest structure 104. The backrest structure 104 has two side rails 116, 117 which are arranged offset from each other in the transverse direction y. The first side rail 116 and the second side rail 117 preferably extend substantially parallel with the vertical direction z. A spacing between the two side rails 116, 117 in the transverse direction y corresponds substantially to the width of the backrest structure 104, wherein the fittings 106 when viewed in this manner remain externally at the front. The two side rails 116, 117 are connected in a lower region of the backrest structure 104 by a lower cross bar 118 which extends parallel with the transverse direction y. The two side rails 116, 117 are additionally connected in an upper region of the backrest structure 104 by the structural component 112.

Figure 3:
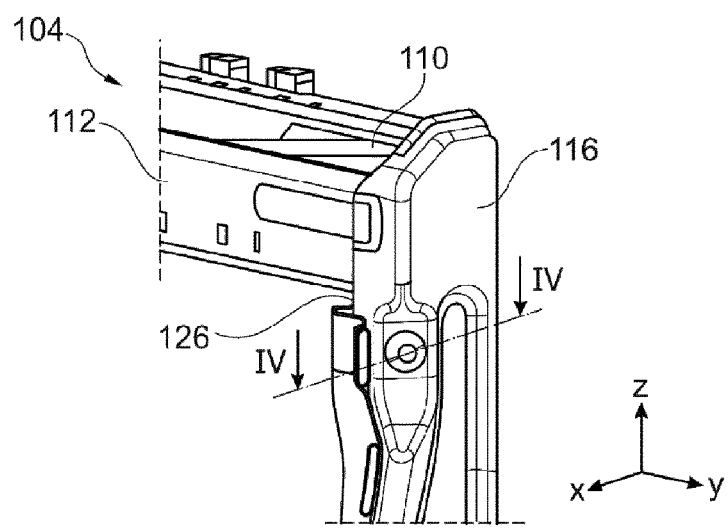
FIG. 3: shows a perspective cut-out view of a backrest structure of a vehicle seat structure when viewed obliquely from the front according to a second embodiment which is not in accordance with the invention and in which a structural component with an automatic belt unit arranged therein forms an upper cross bar of the backrest structure.
Figure 4:
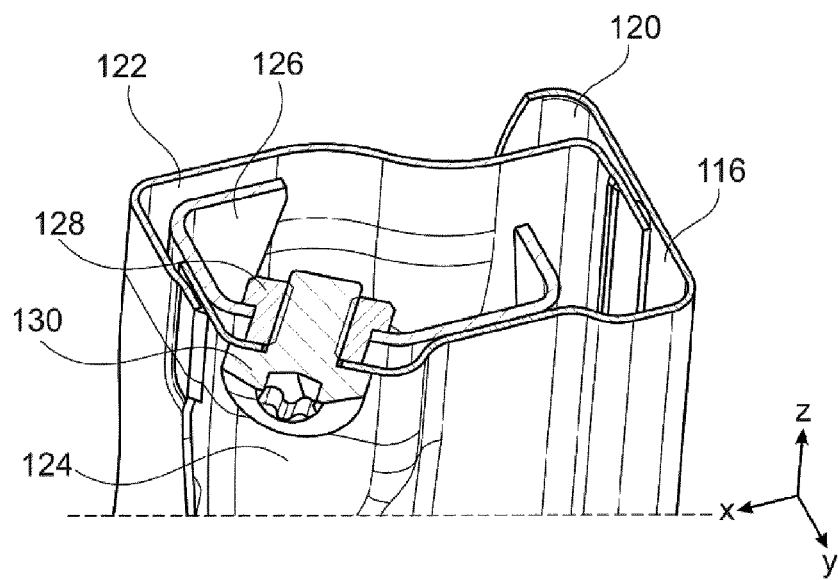
FIG. 4: shows a section along the line IV-IV in FIG. 3, FIG. 5: shows a perspective cut-out view of a backrest structure of a vehicle seat structure when viewed obliquely from the front of a third embodiment which is not in accordance with the invention and in which a structural component with an automatic belt unit arranged therein forms an upper cross bar of the backrest structure.

FIGS. 3 and 4 show a cut-out view of a backrest structure 104 of a vehicle seat structure 100 of a second embodiment, in which a structural component 112 with an automatic belt unit 108 arranged therein forms an upper cross bar of the backrest structure 104. A first side rail 116 of the two side rails 116, 117 is composed of a first side rail profile 120 and a second side rail profile 122. The first side rail 116 is thereby a substantially closed profile with a high degree of bending rigidity and can therefore transmit high forces acting on the belt band 110 in the event of a crash in the direction of the fittings 106. The first side rail 116 is when viewed in the transverse direction y arranged at the side of the structural component 112 from which the belt band 110 extends.

The first side rail profile 120 and the second side rail profile 122 are connected to each other, preferably welded to each other. The first side rail 116 has a hollow space with an approximately right-angled cross-section. Below the structural component 112, the first side rail 116 has a securing face 124 which extends obliquely with respect to the longitudinal direction x and obliquely with respect to the transverse direction y and which has a screw through-hole.

An angled securing member 126 of the structural component 112 is inserted from above into the hollow space of the first side rail 116. The angled securing member 126 protrudes downwards from the structural component 112. The angled securing member 126 is securely connected to the structural component 112. The angled securing member 126 abuts in the longitudinal direction x and in the transverse direction y in each case against an inner face of the first side rail 116. The angled securing member 126 has a thread, in particular a threaded nut 128, which is in alignment with the screw through-hole of the securing face 124. A screw 130, preferably with an M10 or 7/16 inch thread, protrudes through the screw through-hole and is screwed into the threaded nut 128. The angled securing member 126 and consequently the structural component 112 are thereby screwed to the first side rail 116. The screw 130 in this instance pulls the angled securing member 126 in the longitudinal direction x and in the transverse direction y onto a corresponding inner face of the first side rail 116 in such a manner that the angled securing member 126 abuts in two spatial directions against the first side rail 116.

A securing of the structural component 112 to the second side rail 117 can be carried out in a similar manner. Alternatively or additionally, the structural component 112 can be connected in a positive-locking manner to the second side rail 117.

Figure 5:
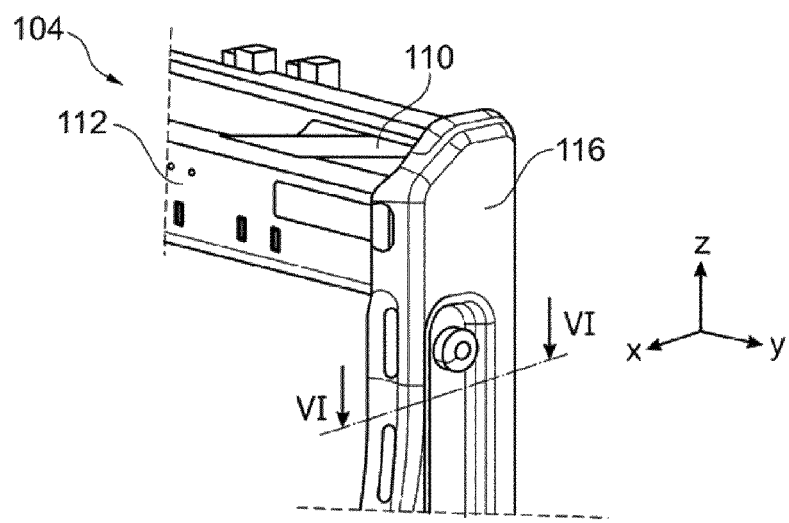
Figure 6:
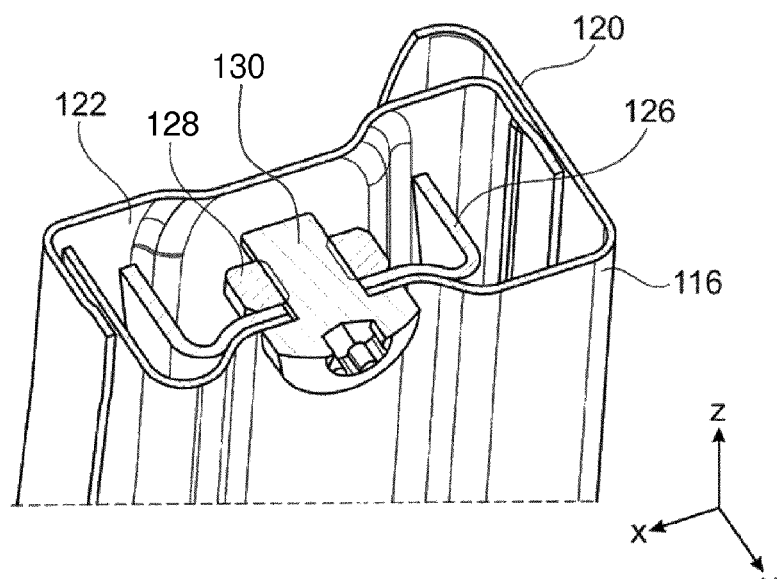
FIG. 6: shows a section along the line VI-VI in FIG. 5, FIG. 7: shows a front cut-out view of a vehicle seat structure according to a fourth embodiment which is not in accordance with the invention during the assembly of a backrest structure, wherein a structural component with an automatic belt unit arranged therein is pivoted about a longitudinal direction relative to two side rails of the backrest structure in the direction of an end position.

FIGS. 5 and 6 show a cut-out view of a backrest structure 104 of a vehicle seat structure 100 of a third embodiment, which with the exception of the differences illustrated in the Figures and described below corresponds to the second embodiment. Comparable components of the different embodiments therefore have the same reference numerals. This also applies to the other embodiments mentioned above and below.

In contrast to the second embodiment, in the third embodiment an angled securing member 126 is screwed with a screw 130 which extends parallel with the transverse direction y. The angled securing member 126 is thereby pulled against precisely one inner face of the first side rail 116. The angled securing member 126 abuts in only precisely one spatial direction against the first side rail 116. During the assembly, the angled securing member 126 can be displaced in the longitudinal direction x in a limited manner relative to the first side rail 116 before the screw 130 is tightened.

Figure 7:
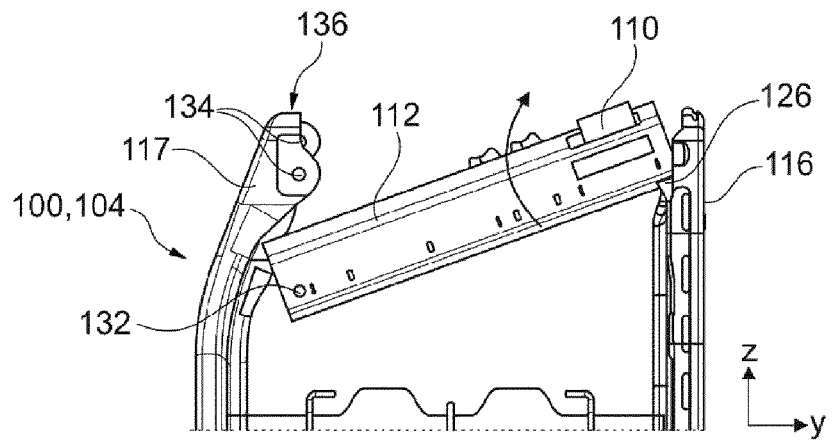
Figure 8:
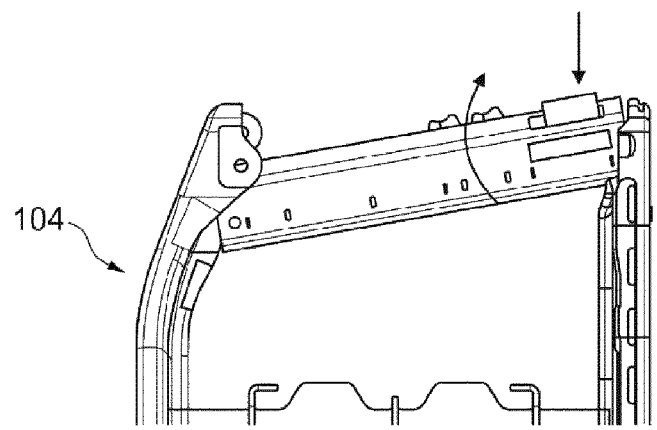
FIG. 8: shows a front cut-out view of a backrest structure from FIG. 7, wherein the structural component with the automatic belt unit arranged therein is pivoted further in the direction of an end position.
Figure 9:
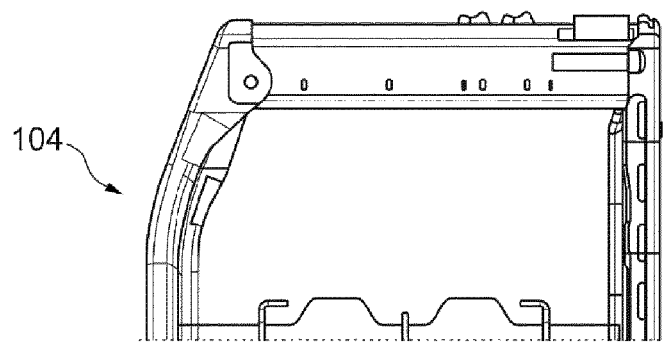
FIG. 9: shows a front cut-out view of the backrest structure from FIG. 7 in an assembled state.

FIGS. 7 to 9 show a front cut-out view of a vehicle seat structure 100 according to a fourth embodiment during the assembly of a backrest structure 104, wherein a structural component 112 with an automatic belt unit arranged therein is pivoted substantially about a pivot axis which extends approximately parallel with the longitudinal direction x relative to two side rails 116, 117 of the backrest structure 104 in the direction of an end position. In this instance, an angled securing member 126 of the structural component 112 is first inserted into a hollow space of one of the two side rails 116 and subsequently pivoted in the direction of the end position of the structural component 112. After the end position of the structural component 112 relative to the side rails 116, 117 has been reached, the structural component 12 is screwed by at least one screw to an end of the structural component 112 opposite the angled securing member 126. To this end, the second side rail 117 has two through-holes 134 which in the end position of the structural component 112 are in alignment with corresponding threads 132 of the structural component 112.

In order to enable the method described above and illustrated in FIGS. 7 to 9 for assembly of the backrest structure 104 of a vehicle seat structure 100, the angled securing member 126 can be inserted into the upper end of the first side rail 116 in such a manner that the structural component 112 can be pivoted in a limited manner about a pivot axis which extends approximately parallel with the longitudinal direction x.

The upper regions of the side rails 116, 117 are preferably each in the form of a U-shaped profile, wherein the open sides of the two side rails 116, 117 face each other. The structural component 112 can thereby be pivoted in the manner described above into the side rails 116, 117. At least one upper end region of the side rails 116, 117 may have a stop face 136 which is constructed in such a manner that the structural component 112 runs against this stop face 136 when the end position of the structural component 112 is reached.

Figure 10:
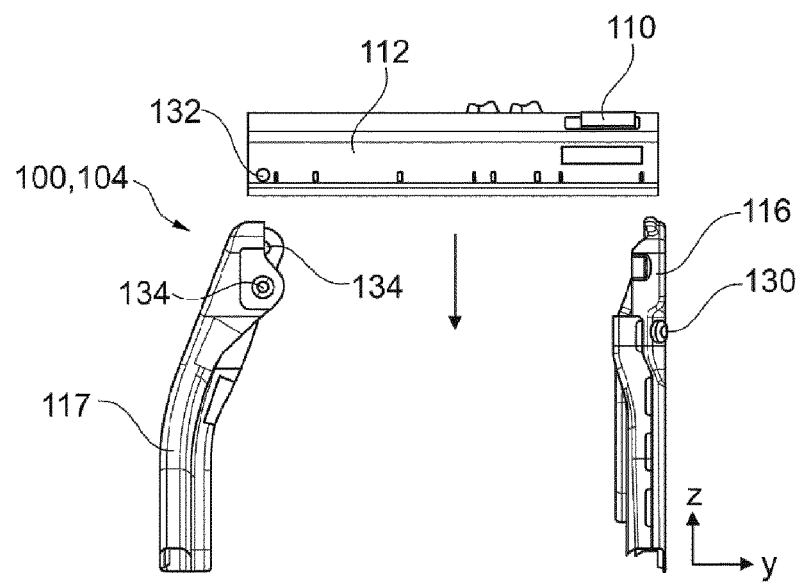
FIG. 10: shows a front cut-out view of the vehicle seat structure according to a fifth embodiment which is not in accordance with the invention during the assembly of a backrest structure, wherein a structural component with an automatic belt unit arranged therein is moved counter to a vertical direction in the direction of an end position.

FIG. 10 shows a front cut-out view of a vehicle seat structure 100 according to a fifth embodiment during the assembly of a backrest structure 104, wherein a structural component 112 with an automatic belt unit arranged therein is inserted substantially counter to the vertical direction from above into two side rails 116, 117 of the backrest structure 104 in the direction of an end position. After the end position of the structural component 112 relative to the side rails 116, 117 is reached, the structural component 112 is screwed at both sides by at least one screw in each case. To this end, the end of the structural component 112 which is associated with the first side rail 116 may have an angled securing member which is not illustrated in FIG. 10. The second side rail 117 may have two through-holes 134 which are in alignment in the end position of the structural component 112 with corresponding threads 132 of the structural component 112.

The upper regions of the side rails 116, 117 are preferably in each case in the form of a U-shaped profile, wherein the open sides of the two side rails 116, 117 face each other. The structural component 112 can thereby be inserted in the manner described above into the side rails 116, 117. At least one of the side rails 116, 117 may have a stop means which is not illustrated in the Figures and which is constructed in such a manner that the structural component 112 runs against this stop means when the end position of the structural component 112 is reached.

Figure 11:
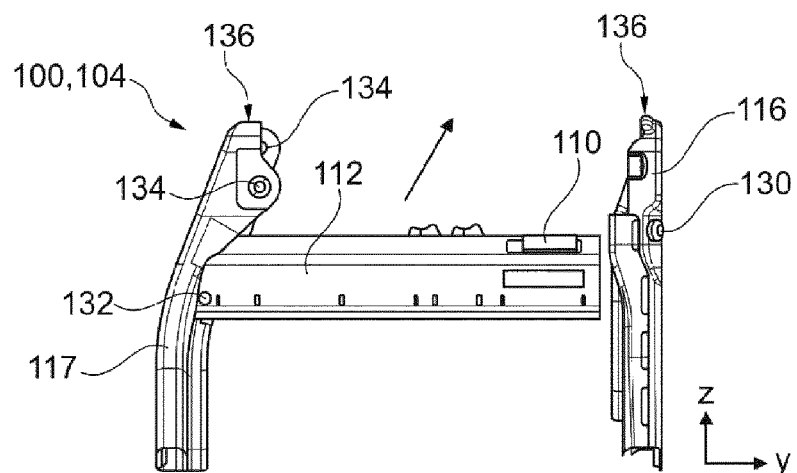
FIG. 11: shows a front cut-out view of the vehicle seat structure according to a sixth embodiment which is not in accordance with the invention during the assembly of a backrest structure, wherein a structural component with an automatic belt unit arranged therein is moved obliquely relative to a vertical direction in the direction of an end position.

FIG. 11 shows a front cut-out view of a vehicle seat structure 100 according to a sixth embodiment during the assembly of a backrest structure 104, wherein a structural component 112 with an automatic belt unit arranged therein is inserted substantially counter to the vertical direction from above into two side rails 116, 117 of the backrest structure 104 in the direction of an end position. After the end position of the structural component 112 relative to the side rails 116, 117 is reached, the structural component 112 is screwed at both sides by at least one screw in each case. To this end, the end, which is associated with the first side rail 116, of the structural component 112 may have an angled securing member which is not illustrated in FIG. 10. The second side rail 117 may have two through-holes 134 which are in alignment in the end position of the structural component 112 with corresponding threads 132 of the structural component 112.

The upper regions of the side rails 116, 117 are preferably in each case in the form of a U-shaped profile, wherein the open sides of the two side rails 116, 117 face each other. The structural component 112 can thereby be inserted in the manner described above into the side rails 116, 117. At least one upper end region of the side rails 116, 117 may have a stop face 136 which is constructed in such a manner that the structural component 112 runs against this stop face 136 when the end position of the structural component 112 is reached.

Figure 12:
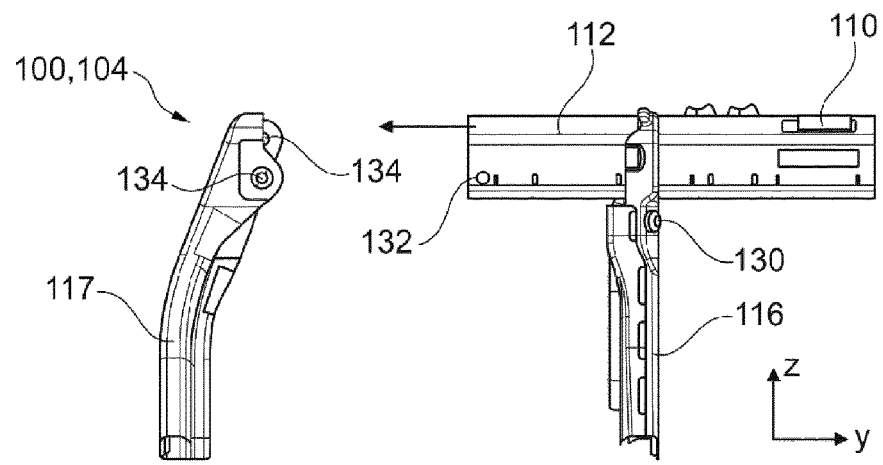
FIG. 12: shows a front cut-out view of the vehicle seat structure according to a seventh embodiment which is not in accordance with the invention during the assembly of a backrest structure, wherein a structural component with an automatic belt unit arranged therein is moved counter to a transverse direction in the direction of an end position.

FIG. 12 shows a front cut-out view of a vehicle seat structure 100 according to a seventh embodiment during the assembly of a backrest structure 104, wherein a structural component 112 with an automatic belt unit arranged therein is inserted parallel with the transverse direction y through an opening of the first side rail 116 in the direction of the second side rail 117. In an end position of the structural component 112, this abuts counter to the transverse direction y against the second side rail 117. After the end position of the structural component 112 relative to the side rails 116, 117 has been reached, the structural component 112 is screwed by at least one screw to the second side rail 117, preferably also to the first side rail 116. The second side rail 117 may have two through-holes 134 which in the end position of the structural component 112 are in alignment with corresponding threads 132 of the structural component 112.

The upper regions of the side rails 116, 117 are preferably in each case in the form of a U-shaped profile, wherein the open sides of the two side rails 116, 117 face each other. The profile of the first side rail 116 additionally has the opening for pushing through the structural component 112. The structural component 112 can thereby be inserted into the side rails 116, 117 in the manner described above.

Figure 13:
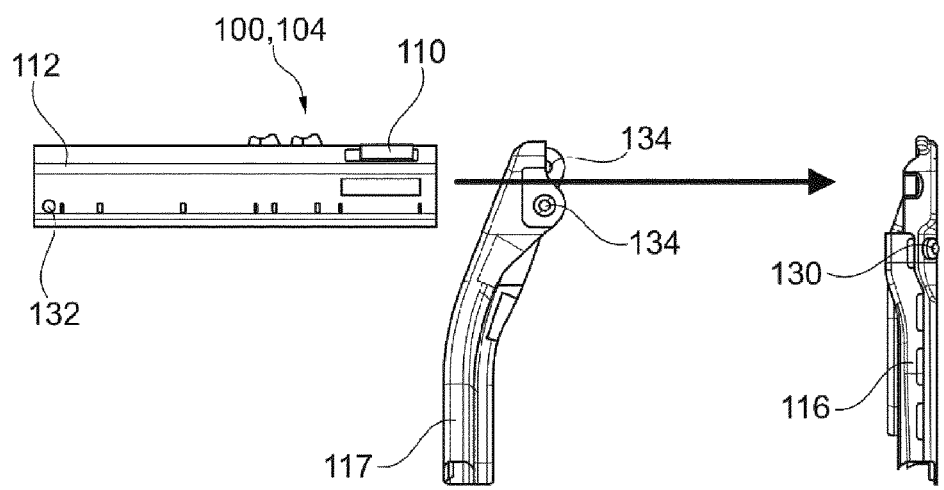
FIG. 13: shows a front cut-out view of the vehicle seat structure according to an eighth embodiment which is not in accordance with the invention during the assembly of a backrest structure, wherein a structural component with an automatic belt unit arranged therein is moved in a transverse direction in the direction of an end position.

FIG. 13 shows a front cut-out view of a vehicle seat structure 100 according to an eighth embodiment during the assembly of a backrest structure 104, wherein a structural component 112 with an automatic belt unit arranged therein is inserted parallel with the transverse direction y through an opening of the second side rail 117 in the direction of the first side rail 116. In an end position of the structural component 112, it abuts counter to the transverse direction y against the first side rail 117. After the end position of the structural component 112 relative to the side rails 116, 117 has been reached, the structural component 112 is screwed by at least one screw to the second side rail 117, preferably also to the first side rail 116. The second side rail 117 may have two through-holes 134 which in the end position of the structural component 112 are in alignment with corresponding threads 132 of the structural component 112.

The upper regions of the side rails 116, 117 are preferably in each case in the form of a U-shaped profile, wherein the open sides of the two side rails 116, 117 face each other. The profile of the second side rail 117 additionally has the opening for pushing through the structural component 112. The structural component 112 can thereby be inserted into the side rails 116, 117 in the manner described above.

Figure 14:
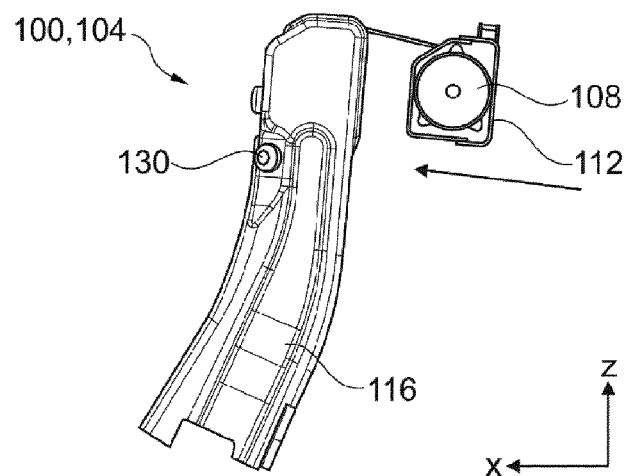
FIG. 14: shows a side cut-out view of the vehicle seat structure according to a ninth embodiment which is not in accordance with the invention during the assembly of a backrest structure, wherein a structural component with an automatic belt unit arranged therein is moved in the longitudinal direction x in the direction of an end position.

FIG. 14 shows a side cut-out view of a vehicle seat structure 100 according to a ninth embodiment during the assembly of a backrest structure 104, wherein a structural component 112 with an automatic belt unit 108 arranged therein is inserted substantially in the longitudinal direction x into the side rails 116, 117. In an end position of the structural component 112, it abuts in a longitudinal direction x against the side rails 116, 117. After the end position of the structural component 112 relative to the side rails 116, 117 has been reached, the structural component 112 is screwed by at least one screw 130 to the first side rail 116, preferably also to the second side rail 117.

The upper regions of the side rails 116, 117 are preferably in each case in the form of an L-shaped profile. The upper end regions of the side rails 116, 117 are preferably in the form of suitcase corners. The structural component 112 can thereby be inserted into the side rails 116, 117 in the manner described above.

Figure 15:
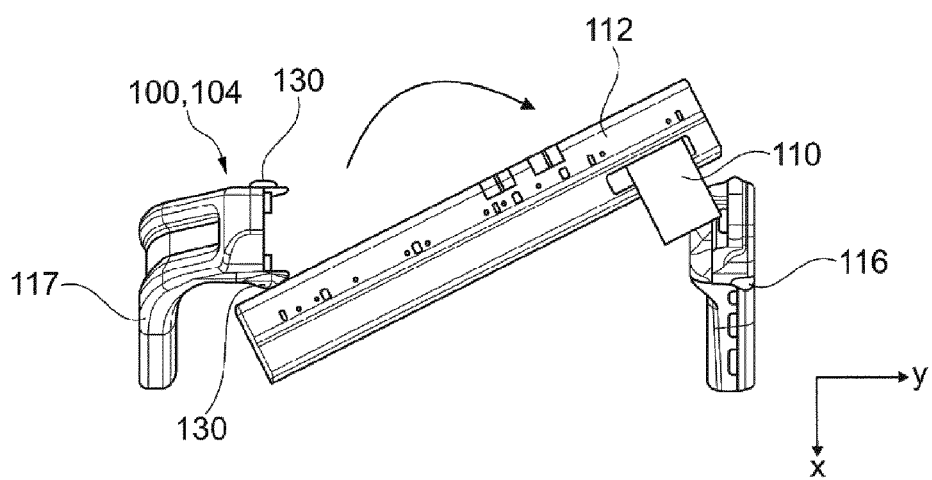
FIG. 15: shows a cut-out view from above of the vehicle seat structure according to a tenth embodiment which is not in accordance with the invention during the assembly of a backrest structure, wherein a structural component with an automatic belt unit arranged therein is pivoted about the vertical direction in the direction of an end position.

FIG. 15 shows a cut-out view from above of a vehicle seat structure 100 according to a tenth embodiment during the assembly of a backrest structure 104, wherein a structural component 112 with an automatic belt unit arranged therein is pivoted substantially about a pivot axis which extends substantially parallel with the vertical direction z relative to two side rails 116, 117 of the backrest structure 104 in the direction of an end position. After the end position of the structural component 112 relative to the side rails 116, 117 has been reached, the structural component 112 is screwed to the side rails 116, 117 by at least one screw 130 in each case.

The upper regions of the side rails 116, 117 are preferably in each case in the form of an L-shaped profile, wherein the first side rail 116 is open towards the rear and the second side rail 117 is open towards the front.

Figure 16:
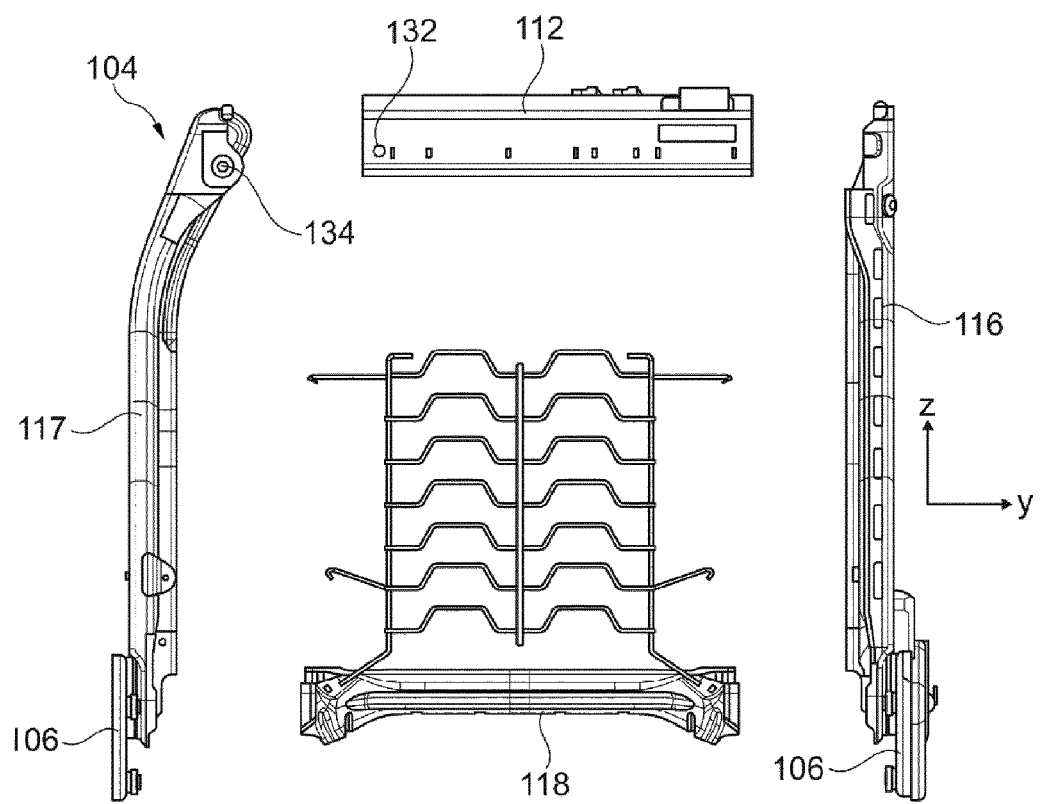
FIG. 16: shows an exploded front view of a backrest structure of a vehicle seat structure according to an eleventh embodiment which is not in accordance with the invention.

FIG. 16 shows an exploded front view of a backrest structure 104 of a vehicle seat structure according to an eleventh embodiment during the assembly of the backrest structure 104. A first side rail 116 and a second side rail 117 are moved towards each other in or counter to the transverse direction y and receive in this instance a structural component 112 with an automatic belt unit arranged therein and a lower cross bar 118.

After the end position of the side rails 116, 117 relative to the structural component 112 has been reached, the structural component 112 is screwed to the side rails 116, 117 by at least one screw in each case. The second side rail 117 and preferably also the first side rail 116 may in each case have at least one through-hole 134 which in the end position of the structural component 112 is in alignment with corresponding threads 132 of the structural component 112.

The upper regions of the side rails 116, 117 are preferably in each case in the form of a U-shaped profile, wherein the open sides of the two side rails 116, 117 face each other.

Figure 17:
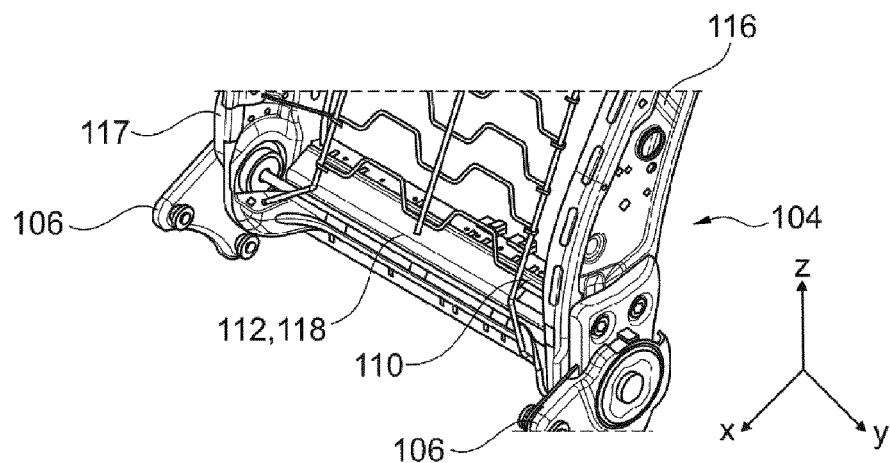
FIG. 17: shows a perspective cut-out view of the backrest structure of a vehicle seat structure when viewed obliquely from the front according to a twelfth embodiment which is not in accordance with the invention and in which a structural component with an automatic belt unit arranged therein forms a lower cross bar of the backrest structure.
Figure 18:
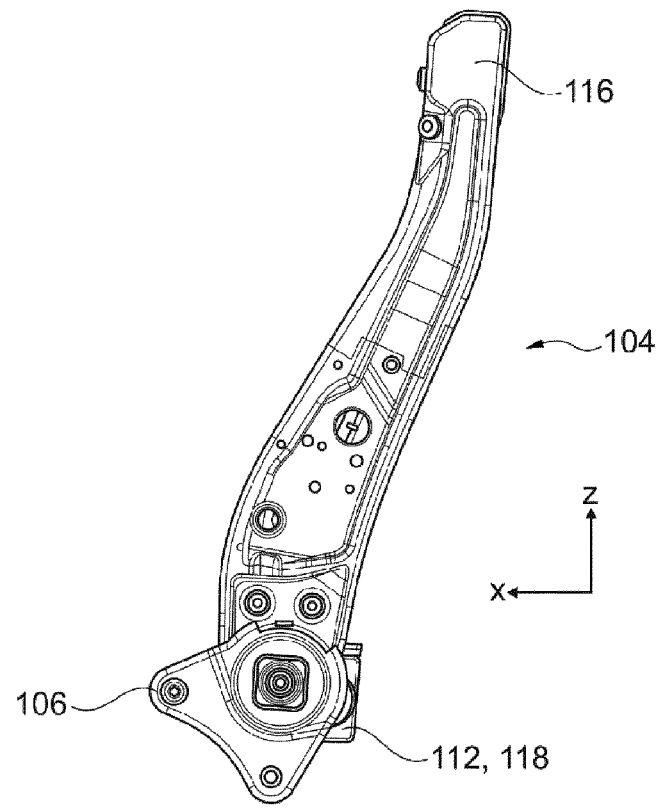
FIG. 18: shows a side view of the backrest structure from FIG. 17, FIG. 19: shows a front cut-out view of the backrest structure of a vehicle seat structure according to a thirteenth embodiment which is not in accordance with the invention and in which a structural component with an automatic belt unit arranged therein forms a portion of a side rail of the backrest structure.

FIGS. 17 and 18 show a backrest structure 104 of a vehicle seat structure according to a twelfth embodiment, in which a structural component 112 with an automatic belt unit arranged therein forms a lower cross bar 118 of the backrest structure 104.

Figure 19:
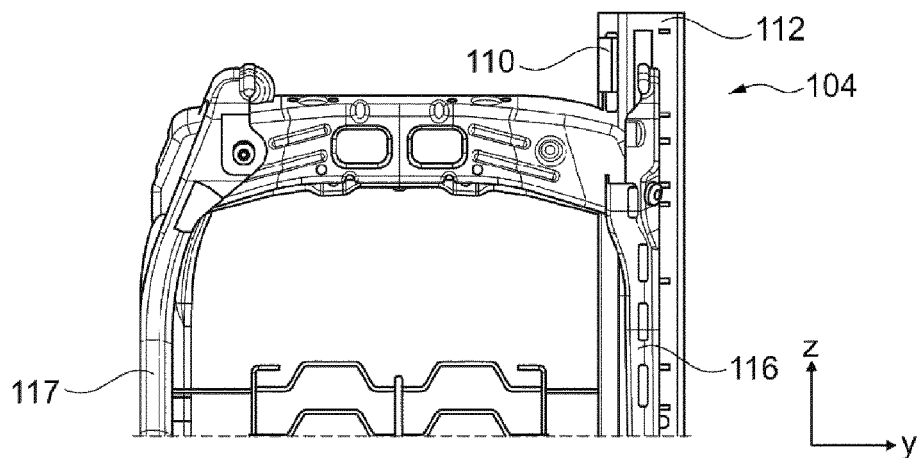
Figure 20:
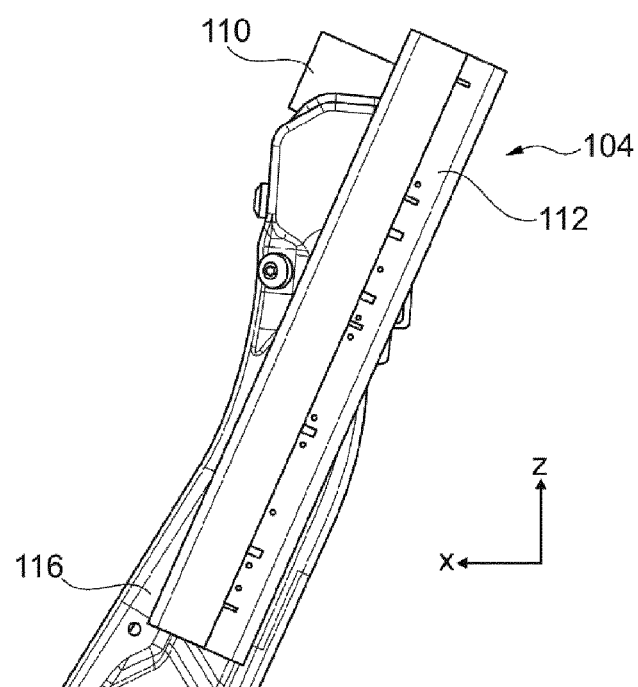
FIG. 20: shows a cut-out side view of the backrest structure from FIG. 19, FIG. 21: shows a perspective cut-out view when viewed obliquely from the front of a vehicle seat structure according to a fourteenth embodiment according to the invention, in which a structural component with an automatic belt unit arranged therein reinforces a side portion of a seat substructure.

FIGS. 19 and 20 show a backrest structure 104 of a vehicle seat structure according to a thirteenth embodiment in which a structural component 112 with an automatic belt unit arranged therein forms a portion of a first side rail 116 of the backrest structure 104. A belt band 110 is accordingly redirected.

Figure 21:
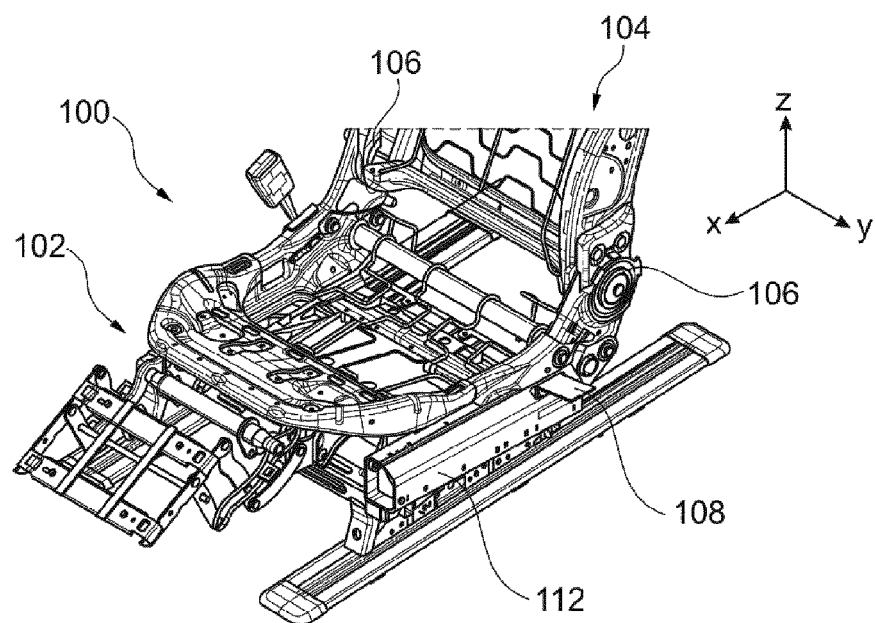
Figure 22:
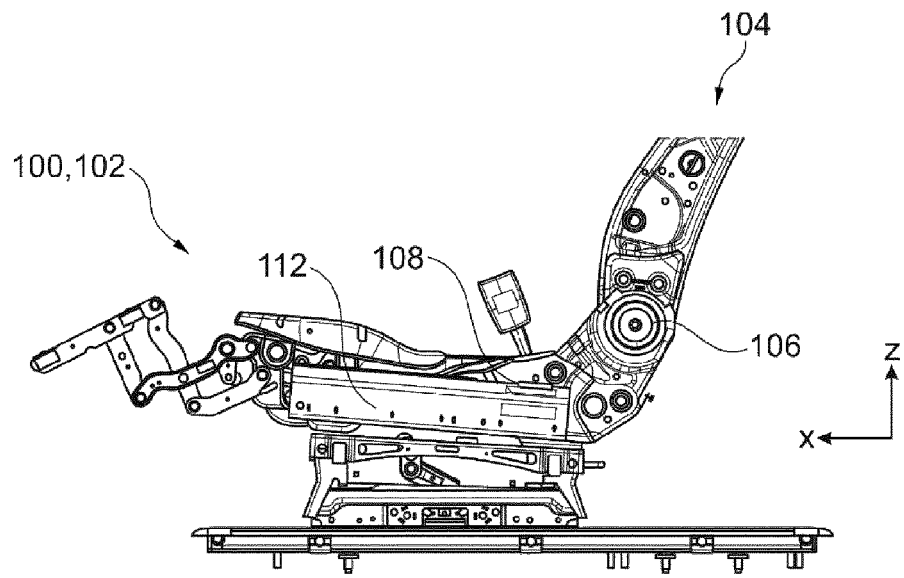
FIG. 22: shows a side view of the vehicle seat structure of FIG. 21, FIG. 23: shows a rear cut-out view of a backrest structure of a vehicle seat structure according to a fifteenth embodiment which is not in accordance with the invention and in which a structural component with an automatic belt unit arranged therein forms an upper cross bar of the backrest structure.

FIGS. 21 and 22 show a seat substructure 102 of a vehicle seat structure 100 according to a fourteenth embodiment according to the invention, in which a structural component 112 with an automatic belt unit arranged therein forms a seat frame side portion as a portion of the seat substructure 102. The automatic belt unit may in particular wind up a lap belt of a safety belt system, in particular a 3-point belt system. The safety belt system may additionally have a second automatic belt unit in the region of the backrest 104.

Figure 23:
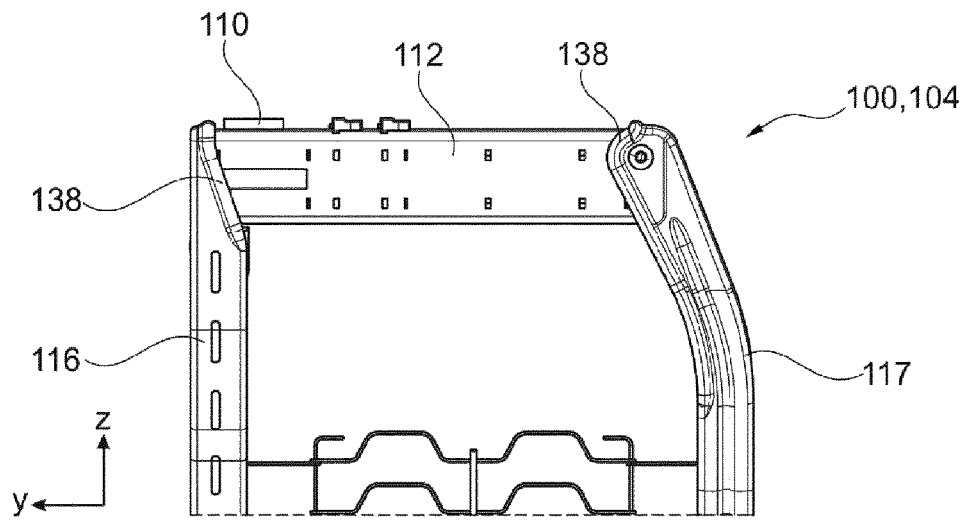
Figure 24:
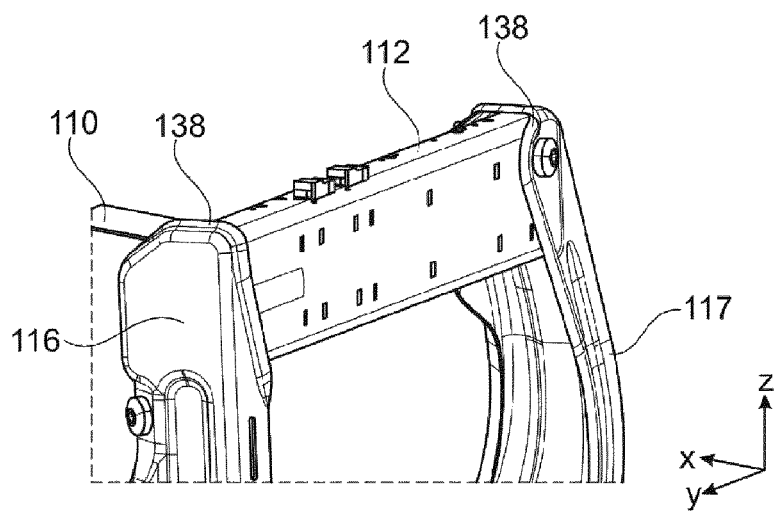
FIG. 24: shows a perspective cut-out view of the backrest structure from FIG. 23, when viewed obliquely from the front.

FIGS. 23 and 24 show a rear view of a backrest structure 104 of a vehicle seat structure 100 according to a fifteenth embodiment in which a structural component 112 with an automatic belt unit arranged therein forms an upper cross bar of the backrest structure 104. The backrest structure 104 has a first side rail 116 and a second side rail 117. The edges of the side rails 116, 117 are at least partially and in sections rounded in order to be able to comply with the legal head impact tests. In particular, backwardly directed edges of the side rails 116, 117 have rounded portions 138. The rounded portions may have a semi-circular cross section. The rounded portions may have a polygonal cross section The rounded portions may have a cross section which can be approximated by a polynomial.

Figure 25:
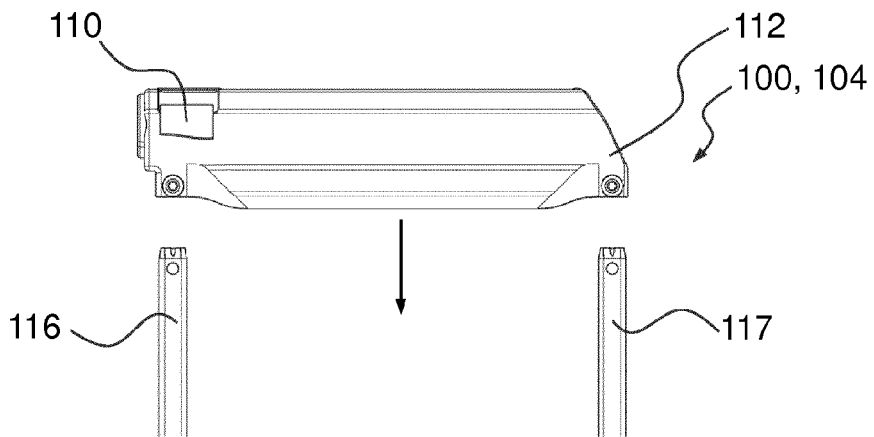
FIG. 25: shows a front cut-out view of a vehicle seat structure according to a sixteenth embodiment which is not in accordance with the invention during the assembly of a backrest structure, wherein a structural component with an automatic belt unit arranged therein is moved counter to a vertical direction in the direction of an end position.
Figure 26:
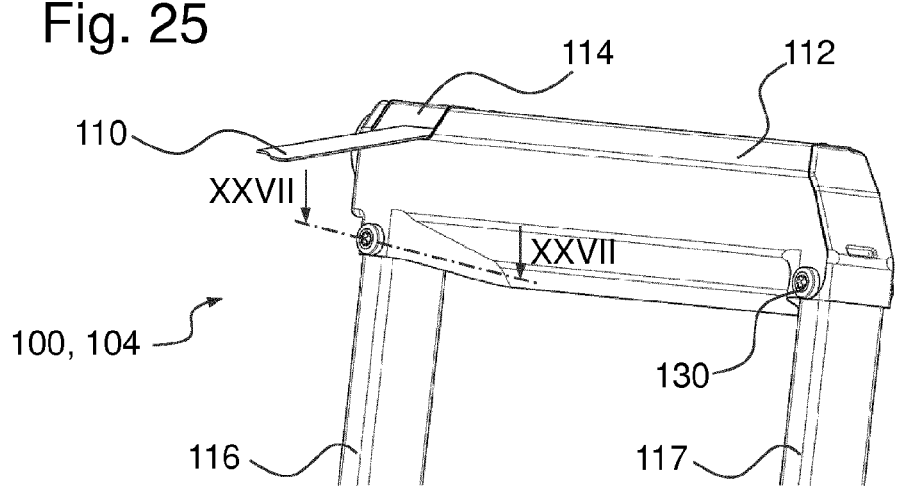
FIG. 26: shows a perspective cut-out view of the backrest structure from FIG. 25, when viewed obliquely from the front.
Figure 27:
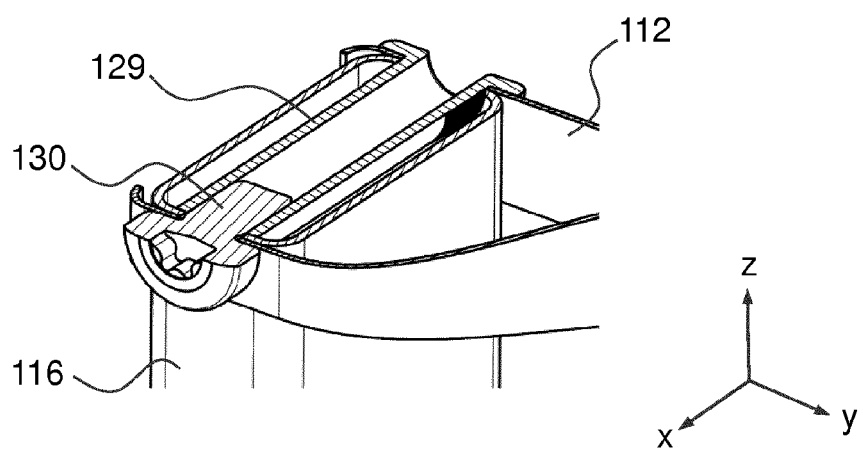
FIG. 27: shows a section along the line XXVII-XXVII in FIG. 26.

FIGS. 25 to 27 show a vehicle seat structure 100 according to a sixteenth embodiment. FIG. 25 shows the vehicle seat structure 100 during the assembly of a backrest structure 104, wherein a structural component 112 with an automatic belt unit arranged therein is pushed substantially counter to the vertical direction z from above onto two side rails 116, 117 of the backrest structure 104 in the direction of an end position. To this end, the upper end regions of the side rails 116, 117 preferably each have a rectangular cross section. The structural component 112 has when viewed in the transverse direction y at both sides in each case an opening in which the end regions of the side rails 116, 117 are received and in the assembled state of the vehicle seat structure 100 are received.

The end regions of the side rails 116, 117 can thereby be inserted into the structural component 112. At least one of the side rails 116, 117 may have a stop means which is not illustrated in the Figures and which is constructed in such a manner that the structural component 112 runs against this stop means when the end position of the structural component 112 is reached.

After the end position of the structural component 112 relative to the side rails 116, 117 as illustrated in FIG. 26 has been reached, the structural component 112 is screwed at both sides by at least one screw 130 in each case. FIG. 27 shows a section through one of the two screw connections, the one between the first side rail 116 and the structural component 112. An opposing screw connection between the second side rail 117 and the structural component 112 is similar, preferably mirror-symmetrical with respect to the screw connection illustrated in FIG. 27.

The side rail 116 and the structural component 112 each have two through-holes which are in alignment with each other. In the end position of the structural component 112, the through-holes of the side rail 116 are in alignment with the associated through-holes of the structural component 112. A threaded sleeve 129 with a collar and an inner thread is inserted through the through-holes which are in alignment with each other into the structural component 112 and the side rail 112 to such an extent that the collar of the threaded sleeve 129 abuts externally against the structural component 112. An end face, facing away from the collar of the threaded sleeve 129, of the threaded sleeve 129 is preferably in abutment internally against the side rail 116. From the side of the structural component 112 facing away from the collar of the threaded sleeve 129, the screw 130 extends through the other two through-holes in the structural component 112 and the side rail 116 and is screwed into the inner thread of the threaded sleeve 129. A screw head of the screw 130 abuts the structural component 112. The structural component 112 is thereby securely connected to the side rail 116.

In a modification of the sixteenth embodiment, at least one threaded sleeve 129 is replaced with a threaded nut. In another modification of the sixteenth embodiment, at least one screw connection is replaced with a rivet connection. In another modification of the sixteenth embodiment, at least one screw connection is replaced with a weld connection. In another modification of the sixteenth embodiment, at least one screw connection is replaced with an adhesive connection.

The features disclosed in the above description, the claims and the Figures may be significant both individually and in combination for implementing the invention in its various embodiments.

Although the invention has been described in detail in the Figures and the previous illustration, the illustrations are intended to be understood to be illustrative and exemplary and not limiting. In particular, the selection of the proportions of the individual elements as illustrated in the drawings is not intended to be interpreted to be necessary or limiting. Furthermore, the invention is in particular not limited to the embodiments explained. Other variants of the invention and their construction will be evident to the person skilled in the art from the above disclosure, the Figures and the claims.

In the claims, the terms used, such as "comprise", "have", "contain", "include", and the like, do not exclude other elements or steps. The use of the indefinite article does not exclude a plurality. An individual device can perform the functions of a plurality of units or devices mentioned in the claims.

LIST OF REFERENCE NUMERALS

100 Vehicle seat structure
102 Seat substructure
104 Backrest structure
106 Fitting
108 Automatic belt unit
110 Belt band
112 Structural component
114 Hollow space
116 First side rail
117 Second side rail
118 Lower cross bar
120 First side rail profile
122 Second side rail profile
124 Securing face
126 Angled securing member
128 Threaded nut
129 Threaded sleeve
130 Screw
132 Thread
134 Through-hole
136 Stop face
138 Rounded portion
x Longitudinal direction
y Transverse direction
z Vertical direction

The invention claimed is:
1. A vehicle seat structure for a vehicle seat, comprising:
a structural component which has an automatic belt unit, wherein the automatic belt unit is arranged in a hollow space of the structural component and the structural component is connected in a positive-locking and/or materially engaging and/or non-positive-locking manner to at least one other component of the vehicle seat structure, wherein the vehicle seat structure has a seat substructure, wherein the structural component which has the automatic belt unit forms a component of the seat substructure, wherein the structural component which has the automatic belt unit forms a seat frame side portion of the seat substructure,
wherein the automatic belt unit for winding up a lap belt of a belt system is arranged in the structural component,
wherein the belt system has a second automatic belt unit in the region of a backrest.

2. The vehicle seat structure according to claim 1, wherein the belt system is in the form of a 3-point belt system.

3. The vehicle seat structure according to claim 1, wherein the belt system is a safety belt system.

4. The vehicle seat structure according to claim 1, wherein the vehicle seat structure has both the structural component having the automatic belt unit for winding up the lap belt of the belt system, and another structural component having an automatic belt unit for winding up a shoulder belt.

5. The vehicle seat structure according to claim 4, wherein the two automatic belt units are a component of precisely one 3-point belt system.

* * * * *